United States Patent [19]

Rosheim

[11] Patent Number: 4,723,460
[45] Date of Patent: Feb. 9, 1988

[54] ROBOT WRIST ACTUATOR

[76] Inventor: Mark E. Rosheim, 1565 St. Paul Ave., St. Paul, Minn. 55102

[21] Appl. No.: 8,151

[22] Filed: Jan. 22, 1987

[63] Continuation at Ser. No. 600,016, Apr. 12, 1984, abandoned.

[51] Int. Cl.$^4$ ............................................. B25J 17/00
[52] U.S. Cl. ........................................ 74/479; 403/58; 901/28; 901/29; 901/25; 901/22
[58] Field of Search .................. 414/735, 730, 4, 2, 414/1; 901/27–29, 25, 22, 15; 403/58, 57; 74/479, 98; 248/179, 184, 284; 33/321

[56] References Cited

U.S. PATENT DOCUMENTS

| 3,069,912 | 12/1962 | Faux et al. | 74/5.34 |
|---|---|---|---|
| 3,246,580 | 4/1966 | Huska | 92/120 |
| 3,405,406 | 10/1968 | Vykukal | 2/2.1 |
| 3,631,737 | 1/1972 | Wells | 74/469 |
| 3,739,923 | 6/1973 | Totsuka | 214/1 |
| 3,784,031 | 1/1974 | Niitu et al. | 214/1 |
| 3,912,172 | 10/1975 | Bolner | 239/265.35 |
| 3,973,469 | 8/1976 | Humen | 91/51 |
| 4,009,644 | 3/1977 | Higuchi et al. | 92/125 |
| 4,045,958 | 9/1977 | Wells | 60/325 |
| 4,046,262 | 9/1977 | Vykukal et al. | 214/1 |
| 4,068,536 | 1/1978 | Stackhouse | 74/417 |
| 4,073,201 | 2/1978 | Taylor et al. | 901/29 X |
| 4,107,948 | 8/1978 | Molaug | 64/2 |
| 4,194,437 | 3/1980 | Rosheim | 92/120 |
| 4,296,681 | 10/1981 | Rosheim | 92/122 |
| 4,353,677 | 10/1982 | Susnjara et al. | 414/735 |
| 4,387,513 | 6/1983 | Cowdin | 74/5.34 X |
| 4,522,555 | 6/1985 | Inoue et al. | 74/479 |

FOREIGN PATENT DOCUMENTS

| 9447 | 4/1980 | European Pat. Off. | 901/29 |
|---|---|---|---|
| 2752236 | 7/1980 | Fed. Rep. of Germany . | |
| 3036116 | 5/1982 | Fed. Rep. of Germany | 901/29 |

OTHER PUBLICATIONS

"Robot Wrist Actuators," Robotics Age, Nov./Dec. 1982, pp. 15–22.
"Pictorial Handbook of Technical Devices," by Pete Grafstein & O. Schwarz, published by the Chemical Publishing Company, Inc. of New York, pp. 16–17, 1971.

Primary Examiner—Robert J. Spar
Assistant Examiner—Donald W. Underwood
Attorney, Agent, or Firm—Kinney & Lange

[57] ABSTRACT

A robot wrist actuator includes a mechanical joint having a forward and a rearward bearing assembly. The bearing assemblies rotate about respective spaced-apart center points positioned along a primary axis. Each bearing assembly includes an outer and an inner bearing. The outer and the inner bearings pivot about respective axes that are substantially perpendicular to each other and intersect at the respective center point. First and second linkage assemblies for transmitting motion from the rearward bearing assembly to the forward bearing assembly are rotatably secured to a housing. The first linkage assembly is attached to the forward outer bearing at one end and to the rearward outer bearing at another end. The second linkage assembly is attached to the forward inner bearing at one end and to the rearward inner bearing at the other end. A drive assembly provides motive force to the rearward bearing assembly. A tool member adapted for tool attachment is attached to the forward outer bearing. Pivotal movement of the rearward bearings about their respective axes caused by the drive assembly is transmitted through the first and second linkage assemblies to the forward assembly so that the tool member is movable in a hemispherical operating range. In addition, the housing is preferably rotatable along the primary axis so that the tool member is movable to any position along a hemispherical operating range in an efficient manner.

19 Claims, 12 Drawing Figures

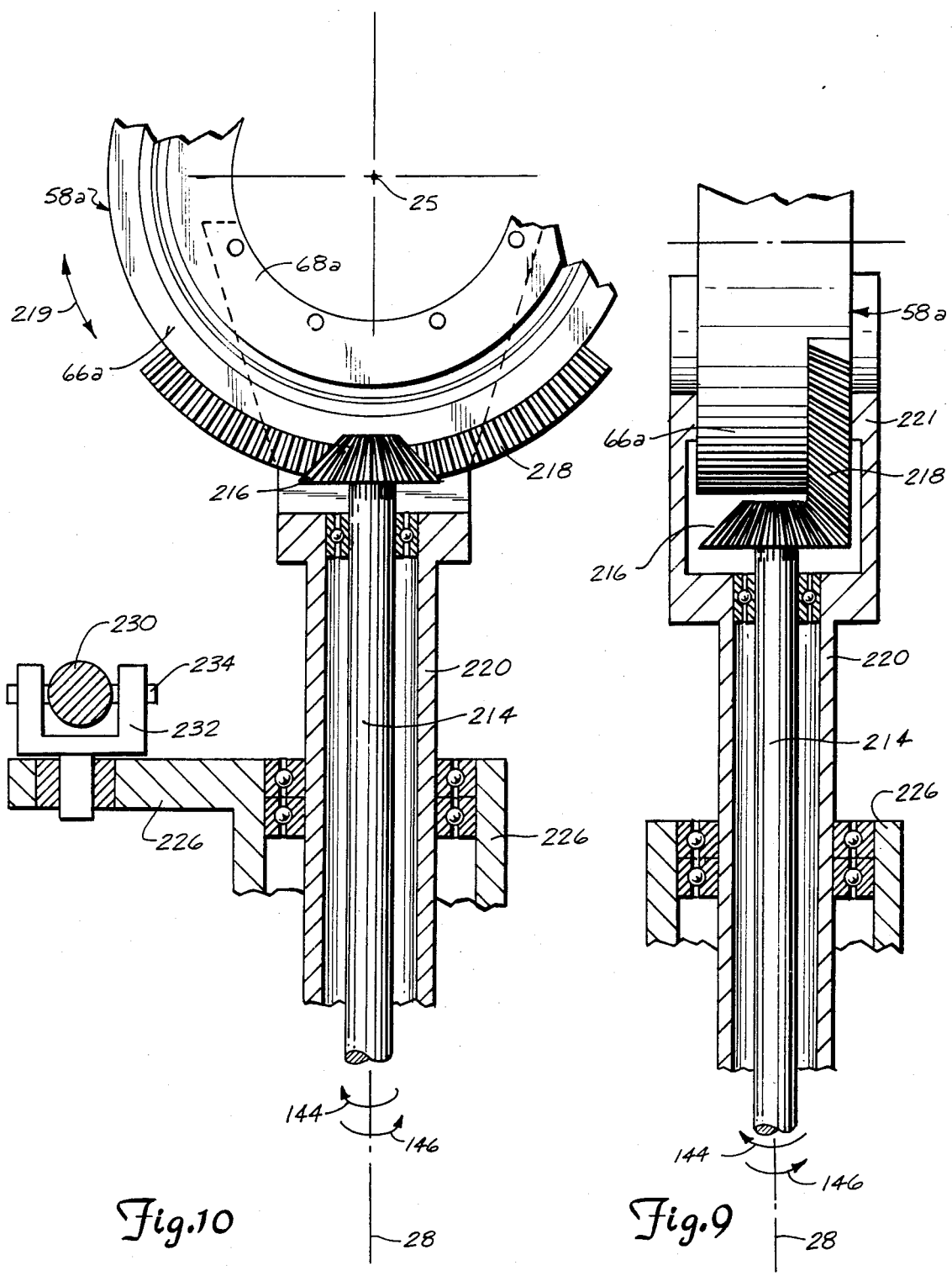

ROBOT WRIST ACTUATOR

This application is a continuation of Ser. No. 600,016, filed Apr. 12, 1984, now abandoned.

BACKGROUND OF THE INVENTION

1. Field of the Invention.

The present invention relates to mechanical joints and robot wrists, and in particular, it relates to robot wrists having a displacement capability throughout a hemispherical operating range.

2. Description of the Prior Art.

Interest in robotics and the use of robots in industrial applications has greatly increased in recent years. One area in which the use of robots has become important is the replacement of humans in tasks that involve manual work, such as welding, material handling, paint spraying, and assembly. Many of these tasks require working in cramped spaces or performing complex maneuvers. To perform such tasks, a robot arm or wrist should be able to rotationally move in a range similar to a human wrist and at a dwell time acceptable for the particular task involved.

One article reviewing the development of robot arms and wrists is entitled, "Robot Wrist Actuators," *Robotics Age*, November/December 1982, pp. 15–22, and was written by the applicant of the present application. In the article, several characteristics are described that make robot wrists attractive. One characteristic is that a mechanical arm or wrist can be safely used in areas where there is a danger of explosion if the wrist is driven by hydraulic actuators. However, there are several disadvantages with the prior art robot arms and wrists. Some of the disadvantages are also enumerated in the above-mentioned article and include large and bulky mechanical joints, slow dwell time in some rotational directions and low mechanical efficiency.

A number of well known universal joints are illustrated and described on pages 16 and 17 of the *Pictorial Handbook of Technical Devices* by Pete Grafstein and O. Schwarz, published by the Chemical Publishing Company, Inc. of N.Y., 1971. Although rotational motion can be transmitted through the universal joints illustrated on pages 16 and 17, the universal joints cannot be used in operations for transmitting pitch, yaw and roll motion to an implement or tool member.

A rotary actuator mechanism is described in the Higuchi et al U.S. Pat. No. 4,009,644. However, the rotary actuator of the Higuchi et al Patent is not very useful for the transmission of pitch, yaw and roll motion to a tool or implement member.

A number of robot joints are illustrated in the Vykukal U.S. Pat. No. 3,405,406 and the Vykukal et al U.S. Pat. No. 4,046,262. The Vykukal patents decribe hard-type space suits that permit the user inside the space suit to move around somewhat unrestricted.

The Bolner U.S. Pat. No. 3,912,172 describes a back-drivable, direct drive, hydraulically-actuated pitch and roll actuator.

The Rosheim U.S. Pat. Nos. 4,194,437 and 4,296,681, which were issued to the applicant of the present application, describe hydraulic servomechanisms which impart rotary movements to a device to be driven.

The Stackhouse U.S. Pat. No. 4,068,536 describes a remotely-driven, mechanical manipulator. The manipulator is controlled by three concentric drive shafts which terminate in a spherically-spaced wrist mechanism.

The Totsuka U.S. Pat. No. 3,739,923 and the Niitu et al U.S. Pat. No. 3,784,031 describe a manipulator arm having two parallel rotating drive shafts in a beveled gear system which translates the drive shaft's rotating motion to a bending pitch motion and rotary roll motion in a tool member.

A mechanical wrist is described in German Pat. No. 2,752,236 that includes three eletric motors, providing pitch, yaw, and roll, which are mounted on the outside of a housing with the inside of the housing being hollow. The wrist is used for holding welding tongs and the hollow inside housing permits electrical power lines to be fed through the wrist.

The Molaug U.S. Pat. No. 4,107,948 describes a flexible robot arm that is composed of a number of mutually connected rigid links being connected at one end to a drive means and at the other end to a tool member that is to be rotated. Another robot arm is illustrated in the Wells U.S. Pat. No. 3,631,737. The robot arm of the Wells patent includes a plurality of rigid tubular sections joined end-to-end by flexible joints to form an articulated arm. The rigid sections are manipulated by slender control cables which are attached to the respective sections and selectively extend and retract.

SUMMARY OF THE INVENTION

The present invention includes a robot wrist actuator having a mechanical joint mounted within a support frame. The mechanical joint includes forward and rearward bearing assemblies. Each assembly is concentrically positioned about respective spaced-apart forward and rearward center points that lie along a primary axis running longitudinally through the housing. Each bearing assembly includes an outer and an inner bearing that are disposed around the respective forward and rearward center points. The outer bearing and the inner bearing are each rotatable about individual rotation axes and are pivotally secured to the housing about individual pivot axes that are perpendicularly disposed with respect to each other and intersect at the respective forward and rearward center points. The inner bearing is secured to the outer bearing so that when the inner bearing is rotated, the outer bearing pivots about its pivot axis about its rotation axis. Similarly, when the outer bearing is rotated about its rotation axis, the inner bearing pivots about its pivot axis.

First and second linkage assemblies transmit pivotal movement of the rearward bearing assembly to the forward bearing assembly. The first linkage assembly is attached at one end to the forward outer bearing and attached at another end to the rearward outer bearing transmitting pivotal movement of the rearward outer bearing to the forward outer bearing. The second linkage assembly is attached at one end to the forward inner bearing and attached at another end to the rearward inner bearing transmitting pivotal movement of the rearward inner bearing to the forward inner bearing.

A drive assembly provides motive force for pivoting the inner and outer bearings of the rearward bearing assembly. A tool member adapted for tool attachment is attached to the forward outer bearing.

Compound rotational motion of the forward bearing assembly and tool member is caused by the drive assembly pivoting both the rearward outer and inner bearings resulting in the first and second linkage assemblies transmitting the same motion to the forward inner and outer bearings so that the tool member is movable in a hemispherical operating range. In an alternative embodiment, the housing is also rotatable along the primary axis so that the tool member is movable along the hemispherical operating range.

BRIEF DESCRIPTION OF THE DRAWINGS

FIGS. 9 and 10 are sectional views of the drive mechanism of FIG. 8.

DETAILED DESCRIPTION OF THE PREFERRED EMBODIMENTS

Figure 1:
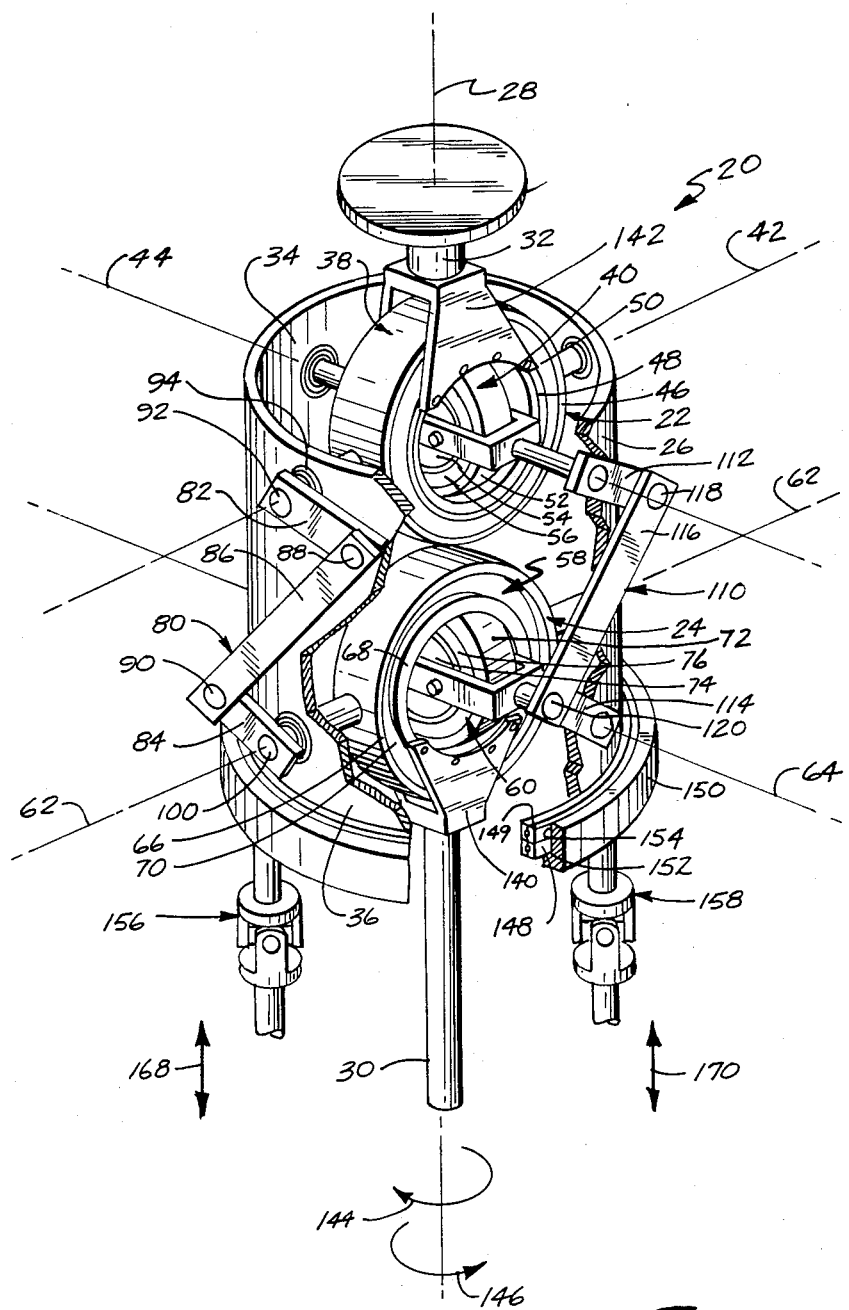
FIG. 1 is a perspective view of the apparatus of the present invention with portions broken away so that the bearing assemblies are more clearly illustrated.

The robot wrist actuator of the present invention is generally indicated at 20 in FIG. 1. Throughout the figures, like reference characters will be used to indicate like elements. The robot wrist actuator includes a forward bearing assembly 22 and a rearward bearing assembly 24 disposed preferably within a housing 26. The housing 26 is preferably a cylindrical wall with a forward portion 34 and a rearward portion 36.

Figure 2:
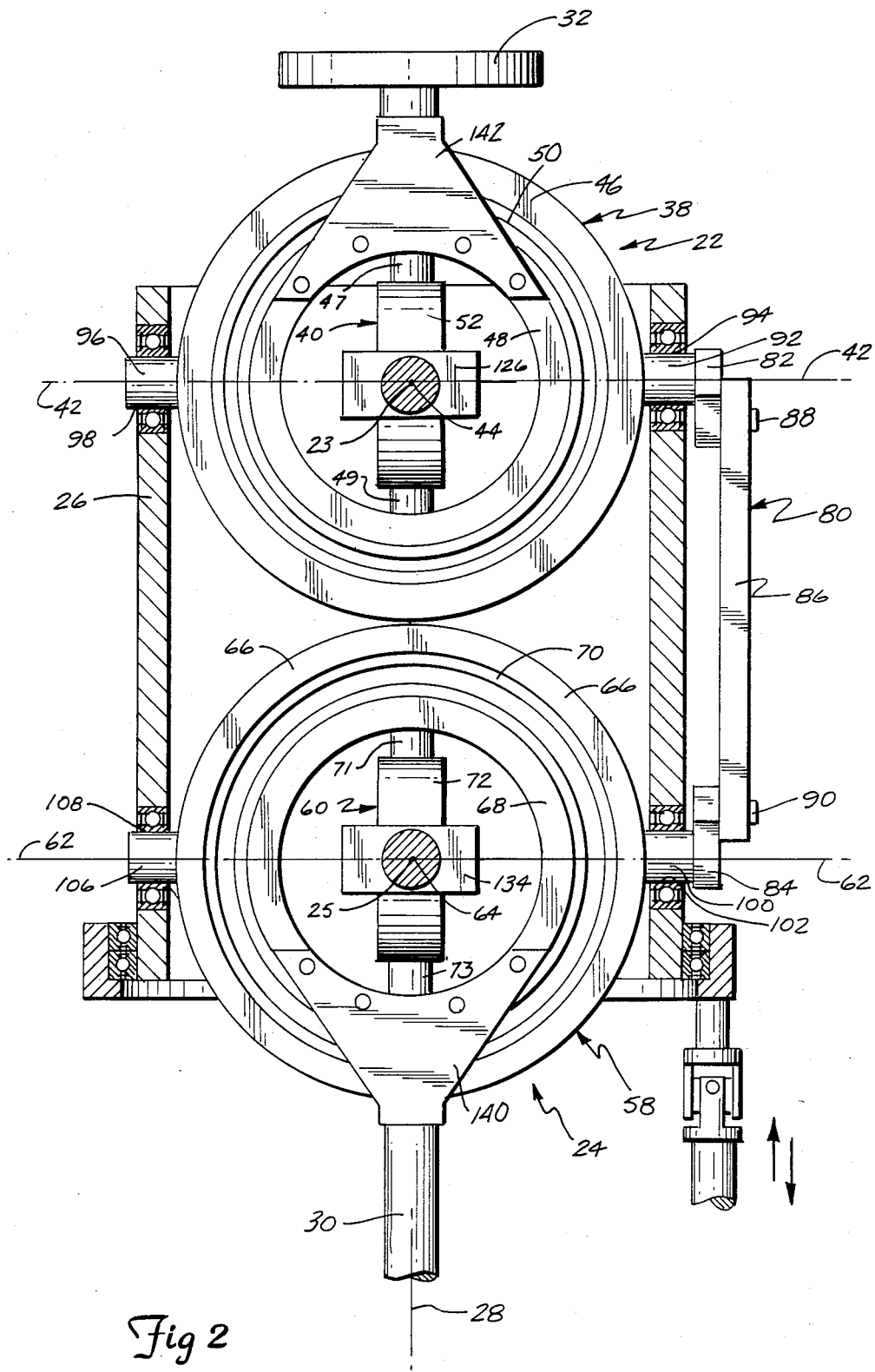
FIG. 2 is a sectional view illustrating the outer bearings and a linkage assembly connecting the two with portions shown whole for purposes of clarity.

The forward and rearward bearing assemblies 22 and 24 rotate about a forward center point 23 and a rearward center point 25, respectively, as illustrated in FIG. 2. The forward and rearward center points are spaced from each other along a primary axis 28 running substantially coaxially through the housing 26. A support and drive shaft 30 (which is discussed subsequently) is attached to the rearward bearing assembly 24 for providing motive force to the present invention. An implement member 32 adapted for mounting an implement thereon, such as a paint sprayer or welding tool, is attached to the forward bearing assembly 22.

Figure 3:
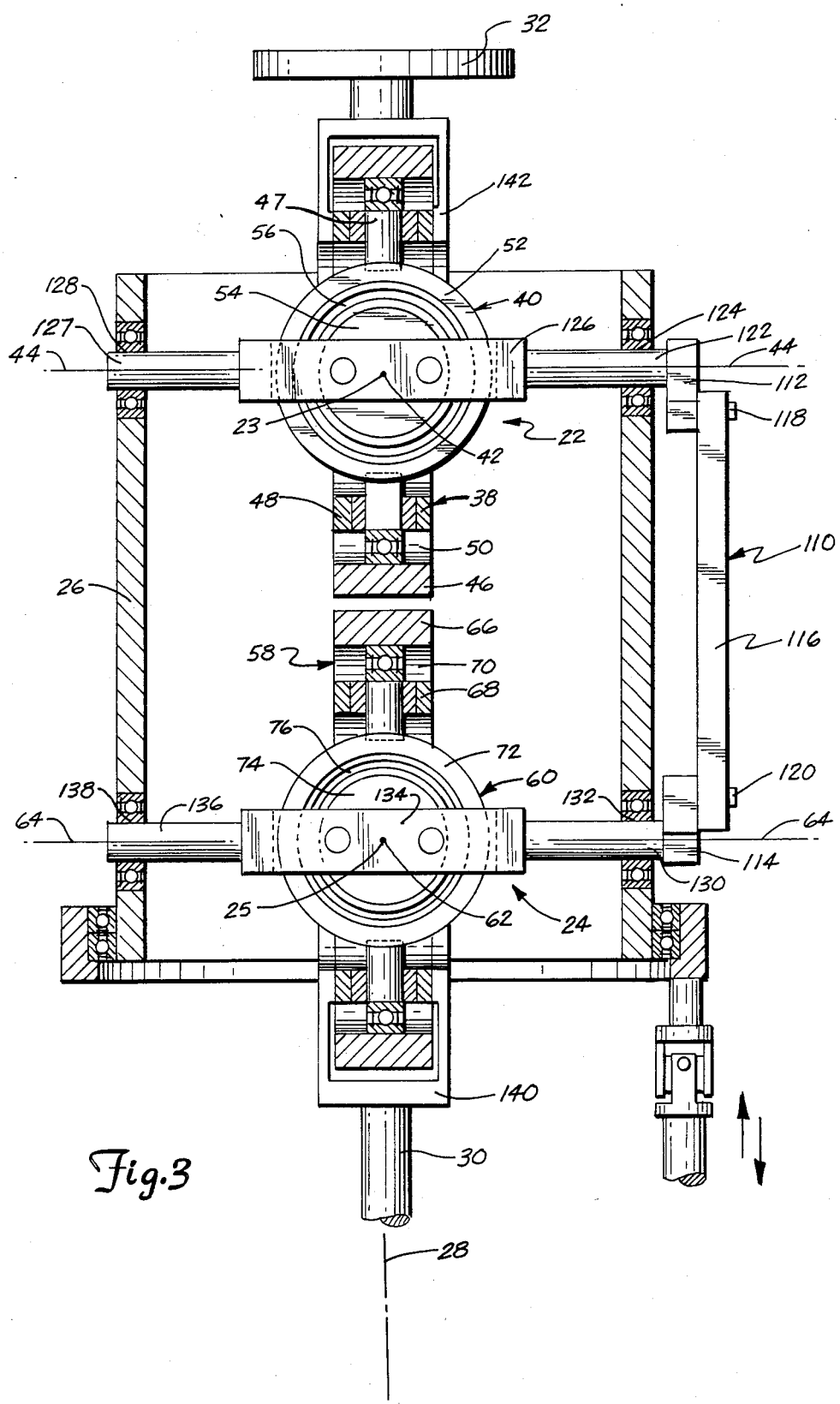
FIG. 3 is a sectional view illustrating the inner bearings and the linkage assembly connecting the inner bearings with portions shown whole for purposes of clarity.

The forward bearing assembly 22 includes a forward outer bearing section 38 and a forward inner bearing 40 section. Both outer and inner bearing sections 38 and 40 are concentrically disposed about the forward center point along the axis 28 each having a movable axis of rotation. The inner bearing section 40 pivots about a first forward pivot axis 44 that runs through the center point 23 and the primary axis 28, as illustrated in FIGS. 1 and 2. The outer bearing section 38 pivots about a second forward pivot axis 42 that runs through the center point 23 and the primary axis 28, as illustrated in FIGS. 1 and 3. The first and second pivot axes 44 and 42 are disposed substantially perpendicularly to each other.

The outer bearing section 38 preferably includes a bearing 50 and an outer ring 46 press fitted onto an outer race surface of the bearing, and an inner ring 48 also press fitted within an inner race surface of the bearing. The rings 46 and 48 rotate freely with respect to each other about the rotation axis of the bearing 50.

Similarly, the inner bearing section 40 has a bearing 56, an outer ring 52 press fitted onto an outer race surface of the bearing 56, and an inner disc 54 also press fitted within an inner race surface of the bearing 56. The ring 52 and disc 54 are free to rotate with respect to each other about the rotation axis of the bearing 56.

The inner bearing section 40 and the outer bearing section 38 are pivotally attached to each other, preferably by pivot pins 47 and 49. Pivot pins 47 and 49 are rigidly secured to the outer ring 52 at one end and rotatably secured within the inner ring 48 at another by bushings or bearings. The pins 47 and 49 are disposed along an axis running through the center point 43. The pivotal connection between the inner bearing section 40 and the outer bearing section 38 permits both bearing sections to pivot about the pivot axes 42 and 44 simultaneously. Although pins are employed to pivotally connect the outer ring 52 with the inner ring 48, any suitable manner of attachment is within the scope of the present invention.

Likewise, the rearward bearing assembly 24 includes an outer bearing section 58 and an inner bearing section 60, as illustrated in FIG. 1, each having a movable axis of rotation. The outer bearing section 58 pivots about a first rearward pivot axis 62 which intersects the rearward center point 25 on the primary axis 28, as illustrated in FIG. 2. The inner bearing section 60 pivots about a second rearward pivot axis 64 that intersects the rearward center point on the primary axis 28, as illustrated in FIG. 3.

The outer bearing section 58 includes a bearing 70, an outer ring 66 press fitted onto an outer race surface of the bearing 70, and an inner ring 68 press fitted onto an inner race surface of the bearing 70. The rings 66 and 68 freely rotate with respect to each other about the rotation axis of the bearing section 58.

The inner bearing section 60 has a bearing 76, an outer ring 72 press fitted onto an outer race surface of the bearing 76, and an inner disc 74 press fitted onto an inner race surface of the bearing 76. The ring 72 and disc 74 freely rotate with respect to each other about the rotation axis of the bearing section 60.

The inner bearing section 60 and the outer bearing section 58 are pivotally attached to each other, preferably by pivot pins 71 and 73. Pivot pins 71 and 73 are rotatably attached to the outer ring 72 at one end and rotatably secured within the inner ring 68 at another end and are disposed along an axis running through the center point 25. The pivotal connection between inner bearing section 60 and outer bearing section 58 permits both bearing sections to pivot about the pivot axes 62 and 64 simultaneously. Although pins are employed to connect the outer ring 72 with the inner ring 68, any suitable manner of attachment is within the scope of the invention.

The bearings 50, 56, 70 and 76 are preferably either roller or ball bearings. Generally, roller or ball bearings include an inner race, an outer race and a plurality of bearings disposed therebetween in grooves. However, any suitable bearings that permit rotation of the rings with respect to each other are within the scope of the present invention.

A first linkage assembly 80 is rotatably secured to the housing 26, as best illustrated in FIGS. 1 and 2. Although the assembly 80 is illustrated as attached to the outside of the housing, the assembly 80 can be positioned within the housing as will be apparent from the description below. The linkage assembly 80 transmits pivotal movement from the rearward outer bearing section 58 to the forward outer bearing section 38. For purposes of description, this pivotal movement is commonly referred to as pitch movement. In one preferred embodiment, the linkage assembly 80 is a non-parallel equal crank linkage assembly that includes a forward pivoting member 82, a rearward pivoting member 84 and a middle pivoting member 86, pivotally connected to each other by linkage pivot pins 88 and 90. A first forward outer bearing section pivot pin 92 is fixedly attached to the pivoting member 82 at one end and extends through an opening 94 in the housing 26 along the pivot axis 42 and is fixedly attached at another end to the outer ring 46 of the bearing section 38. A second forward outer bearing section pivot pin 96 rotatably extends through an opening 98 in the housing 26 at an oppositely-facing location and also extends along the axis 42. The pin 96 is fixedly attached at one end to the outer ring 46 and is rotatably secured to the housing at another end. The outer bearing section 38 is pivotal about the pivot axis 42 while rotating the inner ring 48 of the outer bearing section 38 about the pivot axis 44 of the inner bearing section 40.

Similarly, a first rearward outer bearing section pivot pin 100 is fixedly attached to the pivoting member 84 at one end and extends through an opening 102 in the housing 26 along the pivot axis 62 and is fixedly attached to the outer ring 66 of the bearing section 58 at another end. A second rearward outer bearing section pivot pin 106 is rotatably secured to the housing 26 at one end and extends along the pivot axis 62 through an opening 108 in the housing 26 positioned at an oppositely facing location to the opening 102. The pin 106 is fixedly attached at another end to the outer ring 66 of the bearing section 58. The housing is rotatable about the pivot axis 62 with respect to the outer bearing section 58.

A second linkage assembly 110 is rotatably secured to the housing 26, as best illustrated in FIGS. 1 and 3. Although the assembly 110 is illustrated as attached to the outside of the housing, the assembly 110 can also be positioned within the housing, as will be apparent from the description below. The linkage assembly 110 transmits pivotal movement from the rearward inner bearing section 60 to the forward inner bearing section 40. This pivotal movement is commonly referred to as yaw movement. In the same preferred embodiment as described above with reference to linkage assembly 80, the linkage assembly 110 is a non-parallel equal crank linkage assembly that includes a forward pivoting member 112, a rearward pivoting member 114 and a middle pivoting member 116, pivotally connected to each other by pivot pins 118 and 120. A first forward inner bearing section pivot pin 122 is fixedly attached to the pivot member 112 at one end and extends through an opening 124 in the housing 26 along the pivot axis 44. The pin 122 is attached at another end to a forward slotted block bracket 126 which is securely fastened, such as with screws, to the inner disc 54 of the inner bearing section 40. A second forward inner bearing section pivot pin 127 also positioned on the pivot axis 44 rotatably extends through an opening 128 in the housing 26 positioned at an oppositely-facing location and is attached at another end to the slotted block bracket 126 and provides support along with the pin 122 to the inner bearing section 40 and outer bearing section 38. The manner of support of the inner disc 54 by the slotted block 126 permits free rotation of the outer ring 52 about the rotation axis of the inner bearing section 40 which in turn permits pivotal movement of the outer bearing section 38 about the pivot axis 42.

A first rearward inner bearing section pivot pin 130 is fixedly attached at one end to the rearward pivoting member 114 and rotatably extends through an opening 132 in the housing 26 along the pivot axis 64. The pin 130 is attached at another end to a rearward clevis-type bracket 134. The clevis-type bracket 134 is securely fastened, such as with screws, to the inner disc 74 of the inner bearing section 60. A second rearward inner bearing section pivot pin 136 is rotatably secured to the housing and extends through an opening 138 in the housing at an oppositely-facing location along the pivot axis 64. The pin 136 is fixedly attached at another end to the clevis-type bracket 134. The pins 130, 136 and the clevis-type bracket 134 provide support to the inner bearing section 60 and the outer bearing section 58. The manner of support of the inner disc 74 by the clevis-type bracket 134 permits free rotation of the outer ring 72 about the rotation axis of the inner bearing section 60 which in turn permits pivotal movement of the housing about the pivot axis 62 with respect to the outer bearing section 58.

Referring to FIG. 2, the drive shaft 30 is fixedly attached to the inner ring 68 of the rearward outer bearing section 58 with a drive clevis member 140. The drive clevis member 140 retains the inner ring 68 which permits the outer ring 66 to rotate about the outer bearing section's rotation axis.

The implement member 32 is similarly fixedly attached to the inner ring 48 of the forward outer bearing section 38 by an implement clevis member 142. The clevis member 142 permits free rotation of the inner ring 48 about the outer bearing section's rotation axis.

A pair of bearings 148 and 149 are press-fitted onto the outer surface of the lower portion 36 of the housing 26, as illustrated in FIG. 1. A collar 150 with first and second inwardly-facing shoulders 152 and 154 is press-fitted onto the bearings 148 and 149 such that the housing 26 is free to rotate with respect to the collar 150.

Figure 4:
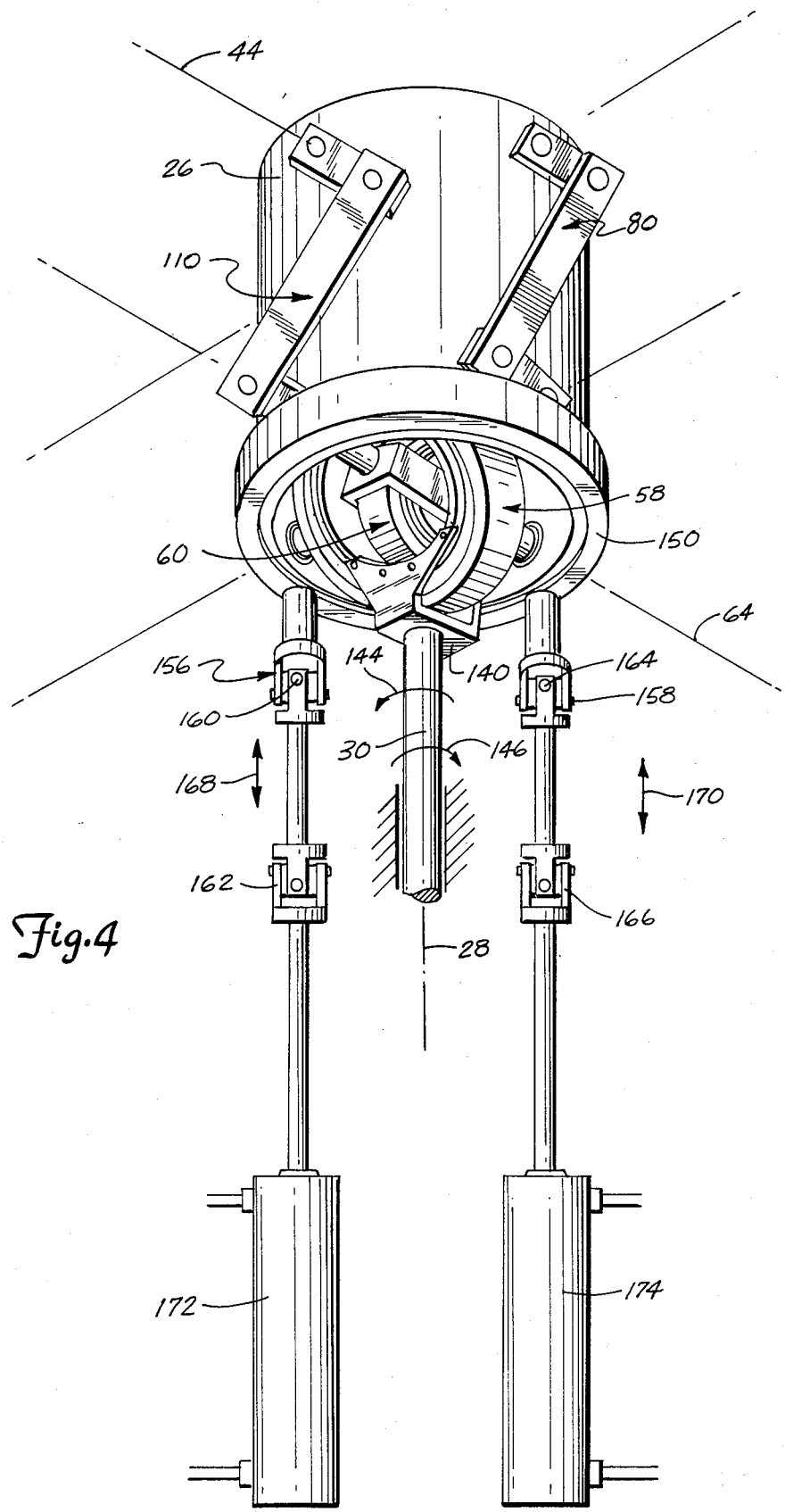
FIG. 4 is a perspective view of the apparatus illustrating its operation using hydraulic cylinders.
Figure 5:
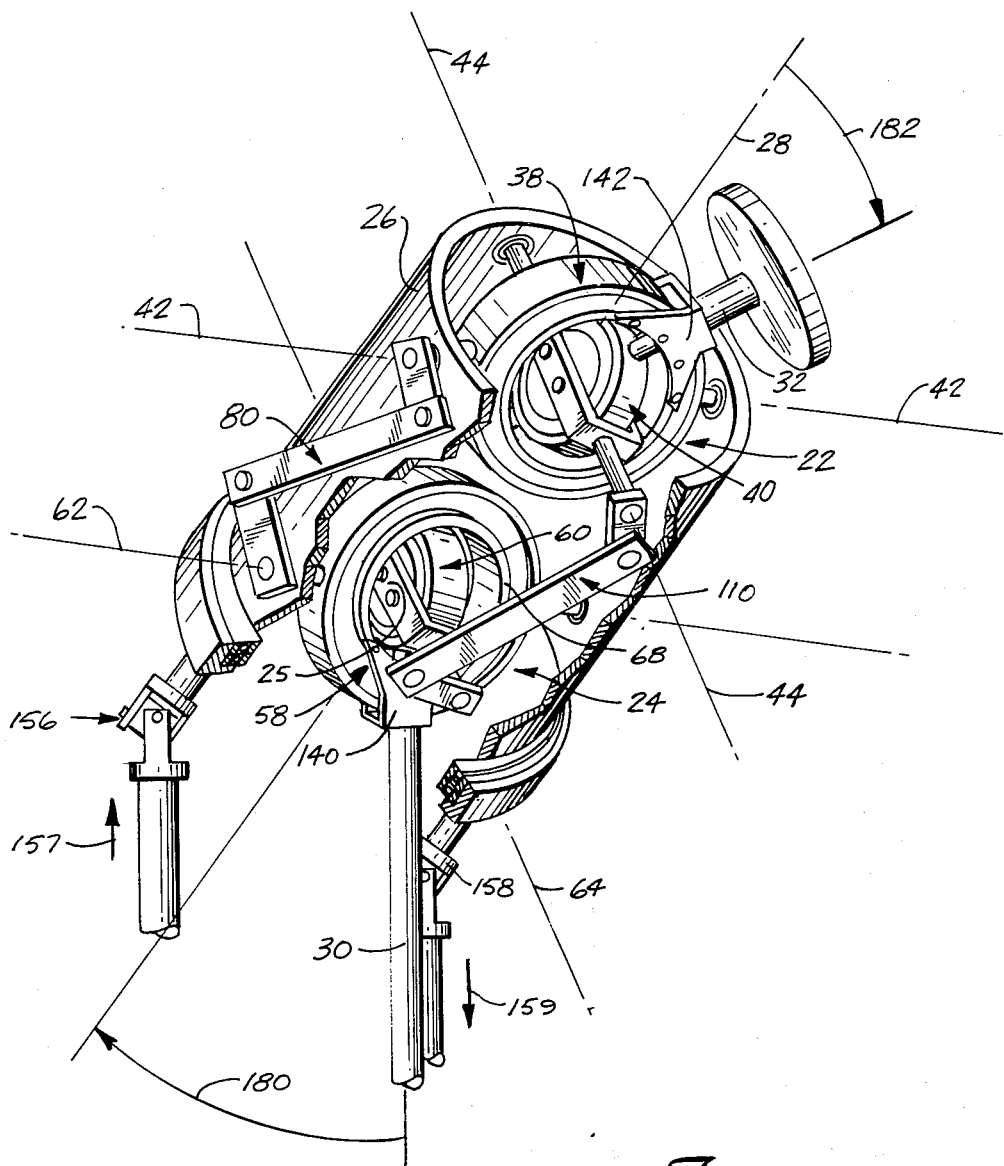
FIG. 5 is a perspective view showing the apparatus in a yaw movement from a primary axis with portions shown whole for purposes of clarity.

The collar 150 is held in a fixed angular position with respect to the axis 28 by first and second push/pull rods 156 and 158. The push/pull rods 156 and 158 are each attached at one end to a rearward surface of the collar 150 in an approximately 90° spaced-apart relationship, as best illustrated in FIG. 4. The push/pull rods 156 and 158 each preferably have a pair of universal joints 160, 162 and 164, 166, respectively. The push/pull rods 156 and 158 are actuated in a general direction of arrows 168 and 170 by well known double-action-type hydraulic cylinders 172 and 174, respectively As illustrated in FIG. 5, when the push/pull rods 156 and 158 are actuated in the direction of arrows 157 and 159, the housing 26 is pivoted about the center point 25 was indicated by axis 28 being moved angularly away from drive shaft 30, as generally indicated by arrow 180, by rotation of the rearward outer bearing section 58 and pivoting of the rearward inner bearing section 60 about pivot axis 64. The linkage 110 transmits the movement to the forward bearing assembly 22, pivoting the forward inner bearing section 40 which rotates the inner ring 48 with the forward outer bearing section 38 imparting a simple yaw movement to the implement member 32, as generally indicated by arrow 182. As will be easily understood, simple yaw movement in an opposite direction is accomplished by actuating push/pull rods 156 and 158 in an opposite direction to arrows 157 and 159.

Figure 6:
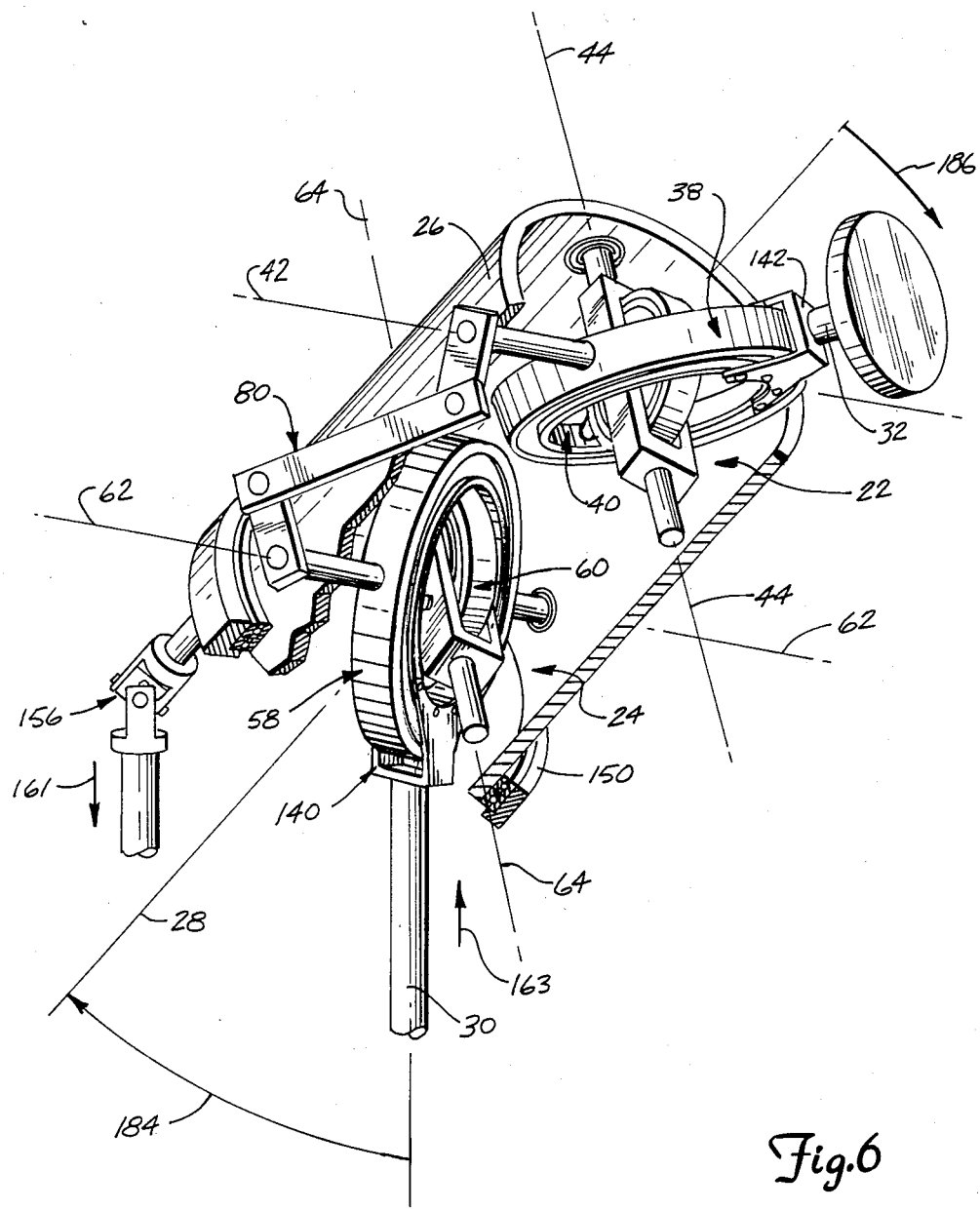
FIG. 6 is a perspective view of the apparatus illustrating pitch movement from the primary illustrating pitch movement from the primary axis with portions shown whole for purposes of clarity.

Simple pitch movement is imparted to implement member 32 by moving one of the push/pull rods in one direction while moving the other push/pull rod in another direction, as illustrated in FIG. 6. For example, push/pull rod 156 is moved in a rearward direction, as indicated by arrow 161, while push/pull rod 158 is actuated in a forward direction as indicated by arrow 163. The housing is pivoted about center point 25 with the rearward outer bearing section 58 pivoting about the axis 62. The pivoting of the bearing section 58 about the axis 62 actuates the linkage assembly 80 which pivots the forward outer bearing section 38 about the pivot axis 42 imparting simple pitch movement to the implement member 32. Pitch movement in an opposite direction is accomplished by reversing the movement of the push/pull rods 156 and 158.

To produce a compound pitch and yaw movement so that the implement member 32 is moved in a hemispherical operating range, the push/pull rods 156 and 158 are moved such that the housing 26 is pivoted in a direction other than the directions described previously for simple pitch and yaw movement. The pivotal connection of the rearward inner and outer bearing sections through pivot pins 71 and 73 and the pivotal connection of the forward inner and outer bearing sections through pivot pins 47 and 49 permit pivotal movement between the respective inner and outer bearing sections such that the bearing section's rotation axes are moved. Both linkage assemblies 80 and 110 are actuated, transmitting pivotal movement of the rearward bearing sections to the forward bearing sections with said movement resulting in movement of the implement 32 to any point in a hemispherical operating range.

To effect more efficient and quicker compound pitch and yaw movement, the housing 26 can be rotated about the primary axis 28. The push rods 156 and 158 hold the roller 150 in a fixed angular position while the housing is rotated by the drive shaft 30. The drive shaft 30 is turned by a suitable drive mechanism (not shown) in either a direction of arrow 144 or the arrow 146, as illustrated in FIG. 1. The attachment of the clevis 140 to the inner ring 68 of the outer bearing section 58 and the bearing section's attachment to the housing 26 through pins 100 and 106 causes the housing to rotate, rotating the implement member 32.

Figure 7:
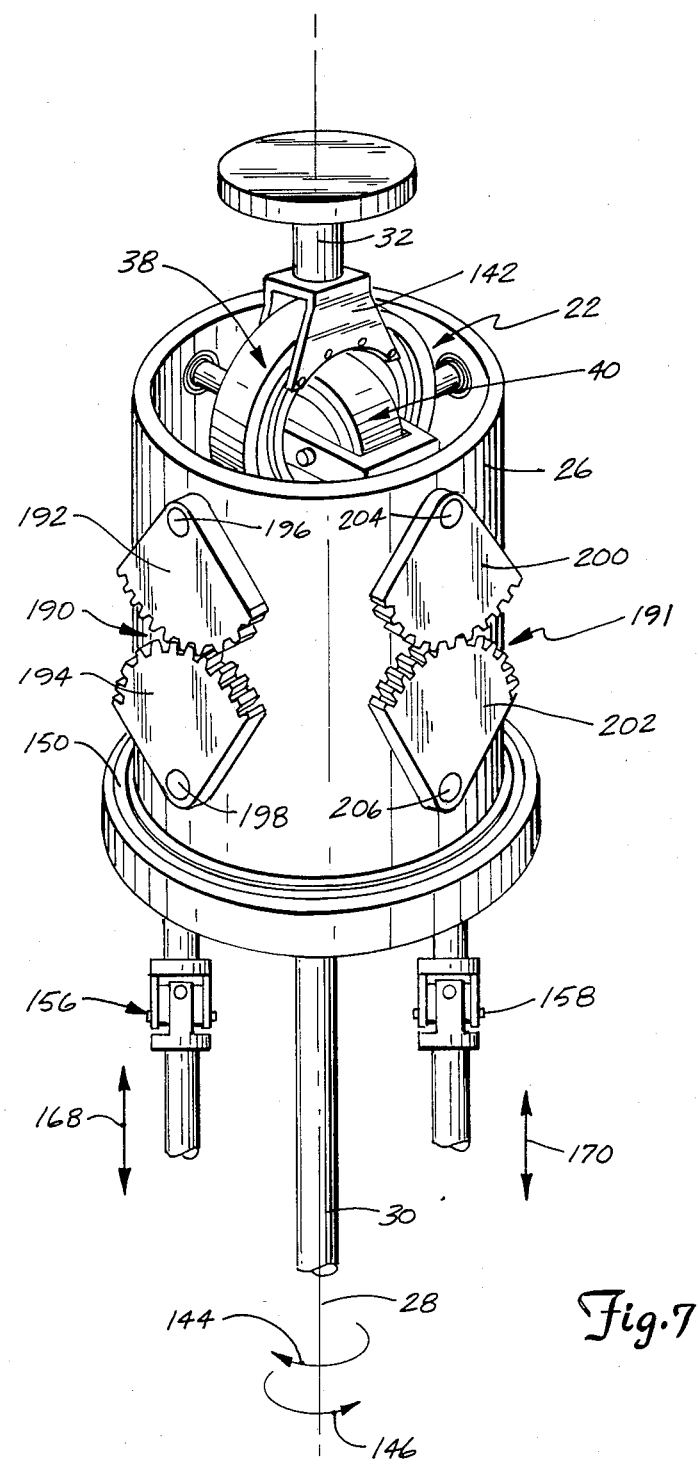
FIG. 7 is a perspective view illustrating an alternative embodiment of the linkage assembly.

In an alternative embodiment, illustrated in FIG. 7, the linkages 80 and 110 are replaced with spur gear linkage assemblies 190 and 191. The spur gear assembly 190 transmits the same simple pitch movement as linkage assembly 80. The spur gear assembly 190 includes a forward pitch spur gear 192 and a rearward pitch spur gear 194. A pin 196 is fixedly attached to the spur gear 192 and rotatably extends through the housing 26 and is fixedly attached at another end to the outer bearing similar to pin 92 as was described with reference to FIG. 2. Likewise, a pin 198 is fixedly attached to the spur gear 194 and rotatably extends through the housing 26 and is fixedly attached at another end to the rearward outer bearing section 58 similar to pin 100, as was described with reference to FIG. 2. As is easily understood, when the push/pull rods 156 and 158 are moved as previously described with reference to FIG. 6, pivotal movement of the rearward bearing section 58 will be transmitted from spur gear 194 to spur gear 192 and to the forward outer bearing section 38 and the implement member 32.

Likewise, spur gear assembly 191 includes a forward yaw spur gear 200 and a rearward yaw spur gear 202 with the forward spur gear being rotatably attached to the inner bearing section 40 by a pin 204 in a similar fashion as pin 122 in the embodiment illustrated in FIG. 3. The rearward spur gear 202 is attached to the rearward inner bearing 60 by a pin 206 in a similar fashion as pin 130 in the embodiment illustrated in FIG. 3. As is easily understood, when the push/pull rods are moved as was previously described with reference to FIG. 5, pivotal movement of the rearward inner bearing section 60 will be transmitted from spur gear 202 to spur gear 200 and to the forward inner bearing section 40 and the implement member 32. Although the spur gear assemblies are shown positioned on the outside of the housing, they may be positioned within the housing for some applications Compound pitch and yaw movement is effected through the spur gear assemblies 190 and 191 in a like manner as was described previously with reference to the embodiment having the linkage assemblies 80 and 110.

Figure 8:
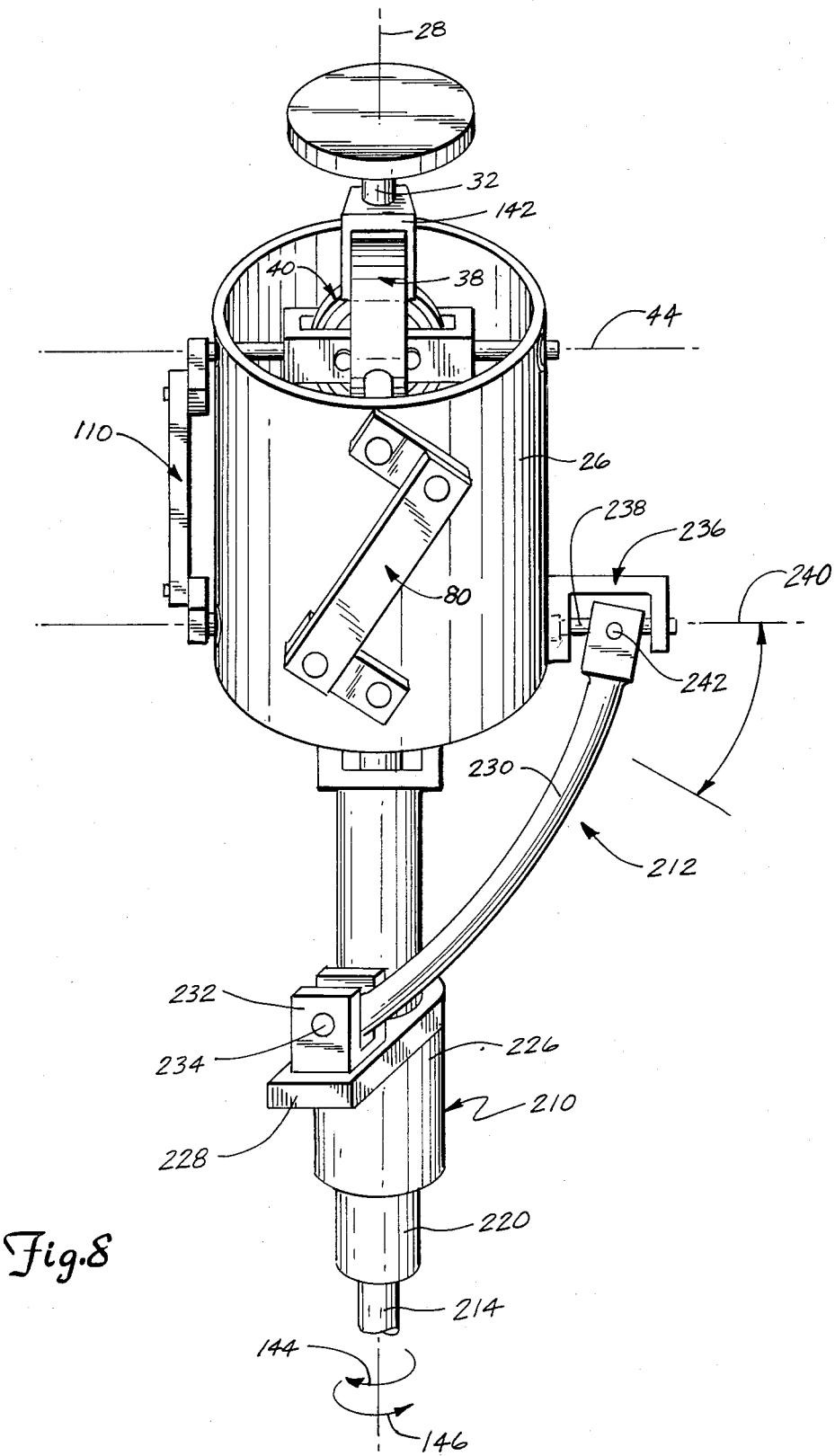
FIG. 8 is a perspective view of an alternative embodiment of a drive mechanism of the drive mechanism of FIG. 8.

In a further alternative embodiment, illustrated in FIGS. 8-10, compound pitch and yaw movement of the apparatus of the present invention is effected by a triordinate drive shaft assembly 210 and a connecting arm assembly 212 replacing the drive shaft 30 and the push/pull rods 156 and 158. The triordinate drive shaft assembly 210 includes a primary rotating drive shaft 214, a rotatable support sleeve 220 and a rotatable outer connecting arm support sleeve 226.

The primary rotating drive shaft 214 has a first beveled gear 216 attached at an upper end thereof, as best illustrated in FIGS. 9 and 10. The outer bearing section 58a has an outer ring 66a with a second beveled gear portion 218 adapted for cooperation with the beveled gear 216. The outer bearing section 58a is quite similar to the outer bearing section 58 described previously and is pivotally mounted to the housing 26 by pivot pins 100 and 106 as previously described with reference to FIG. 2. However, the drive shaft 214, unlike the drive shaft 30 in the embodiment shown in FIG. 2, does not provide rotational movement to the housing 26 but instead imparts yaw movement by rotating the inner ring 68a of the outer bearing section 58a in a general direction of arrow 219 thereby pivoting the rearward bearing section about center point 25. The linkage 110 then transmits the movement to the forward inner bearing section 40, pivoting the bearing section 40 and imparting simple yaw movement to the implement member 32.

The support sleeve 220 has an upper clevis portion 221 which is fixedly attached to the inner ring 68a. When the outer sleeve 220 is rotated in a direction of arrow 144 or arrow 146, rotational movement of the housing is effected The connecting arm assembly 212, as best illustrated in FIG. 8, includes. a connecting arm member 230 whose lower end is pivotally attached to a bracket 232. The bracket 232 is fixedly attached to an outwardly extending plate 228 which in turn is integral to the outer sleeve 226. A pin 234 pivotally attaches the connecting arm member 230 to the bracket 232. An upper portion of the connecting arm 230 is pivotally attached to the housing 26. The arm 230 is pivotally attached by a universal joint 236 which is fixedly attached to the housing 26. The universal joint 236 includes a first universal joint pin 238 rotatable about a pivot axis 240 (similar to previously described pivot axis 64) that is angularly displaced approximately 90° from the pivot pin 234. A second universal pivot pin 242 rotatably extends within the first universal joint pivot pin 238 attaching the upper portion of the connecting arm 230 to the universal joint 236. When the outer sleeve 226 is rotated in the direction of either arrow 144 or 146, the housing 26 is tilted with the rearward outer bearing section pivoting about the pivot axis 240. The pivoting movement is transmitted through the linkage 80 to the forward outer bearing section, effecting a pitch movement to the implement member 32.

Figure 11:
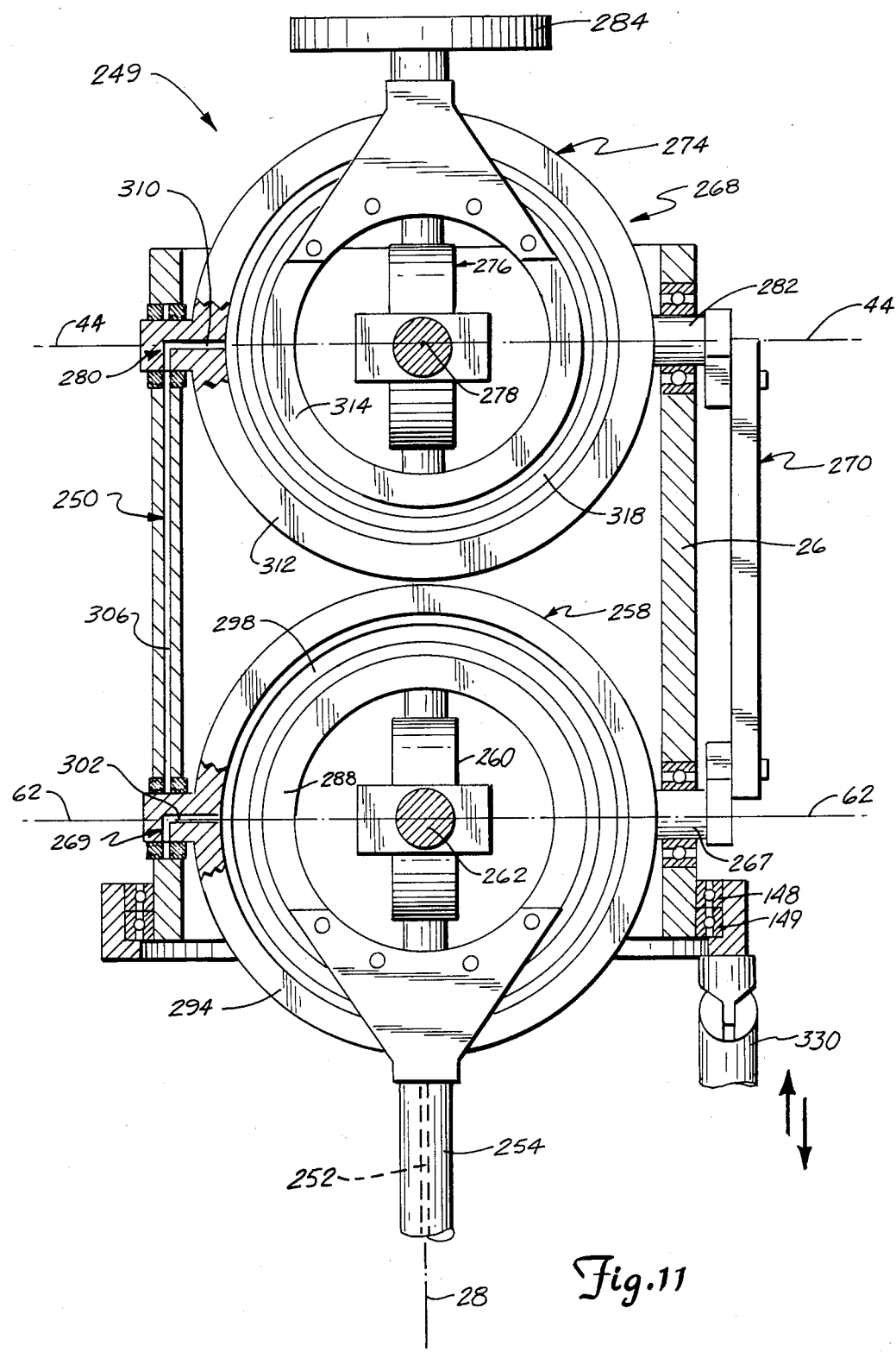
FIGS. 11 and 12 are sectional views of an alternative embodiment having a fluid passage.
Figure 12:
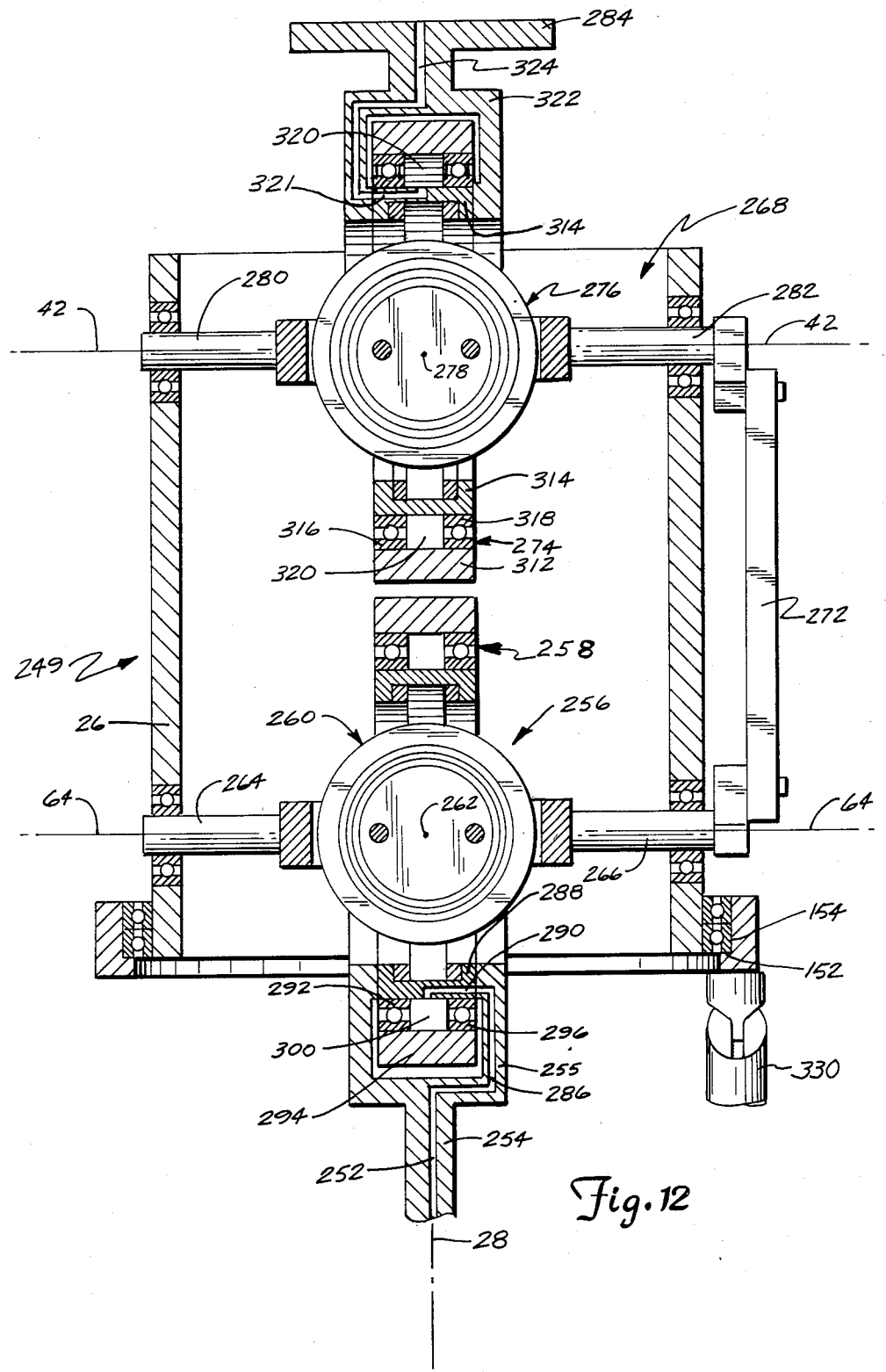

In a further preferred embodiment generally indicated at 249 in FIGS. 11 and 12, the apparatus of the present invention is provided with a fluid passage generally indicated at 250 in FIG. 11. The fluid passage 250 provides a path for the transport of air or other fluids, gas or liquid, wherein the entire passage is defined by elements of rigid and durable construction. Prior art fluid passageways made of flexible material sections needed frequent maintenance and replacement due to the continuous flexing that is experienced from the continual movement of a robot wrist or other similar joint. The preferred embodiment illustrated in FIGS. 11 and 12 eliminates this problem.

Referring specifically to FIG. 12, the passageway 250 delivers air or any other desired fluid, gas or liquid, from a suitable source entering a drive shaft channel 252 in a drive shaft 254. The embodiment 249 is similar in construction to the embodiment 20 illustrated in FIGS. 1 through 6 and will be described only briefly below. The drive shaft 254 is connected to a rearward bearing assembly 256 having an outer bearing section 258 and an inner bearing section 260. The rearward bearing sections 258 and 260 rotate about a common center point 262 disposed at the intersection of the longitudinal axis 28 of the housing 26. The inner bearing section 260 pivots within the housing 26 on pivot pins 264 and 266 which are disposed on the pivot axis 64, as illustrated in FIG. 12 and the outer bearing section pivots about the axis 62 on pivot pin 267 and a rotary-type union 269.

Movement from the rearward bearing assembly is transmitted to a forward bearing assembly 268 by pitch linkage assembly 270 and yaw linkage assembly 272, as previously described with reference to FIGS. 1–3. The forward bearing assembly 268 also has an bearing section 274 and an inner bearing section 276 disposed about a common center point 278 which is positioned on the longitudinal axis 28. The outer bearing section 274 is pivotally attached to the housing 26 along the pivot axis 42 by a rotary-type union 280 and a pivot pin 282. The preferred embodiment in FIGS. 11 and 12 functions in much the same way as the apparatus described with reference to FIGS. 1–3, moving an implement member 284 in a hemispherical operating range.

The fluid channel 252 in the drive shaft 254 is connected to a fluid channel 286 in a clevis member 255. The clevis member 255 is fixedly attached to an inner ring 288 of the outer bearing section 258. The clevis channel 286 is fluidly connected to a channel section 290 of the inner ring 288 of the bearing section 258. The outer bearing section 258 further includes spaced-apart bearings 292 and 296 in press fitting relationship with the inner ring 288 and an outer ring 294. The spaced-apart bearings 292 and 296 define an annular channel section 300 between the inner and outer rings of the outer bearing section 258. The channel section 300 is fluidly connected to the channel section 290 of the inner ring 288. A channel section 302 extends through the outer ring 294 and into a rotatable section of the rotary union 269. The channel 302 is fluidly connected through the rotary union to a channel section 306 disposed within the housing 26. The channel section 306 in turn is fluidly connected to a channel section 310 by the rotary union 280.

The forward outer bearing section 274 similarly contains an outer ring 312 and an inner ring 314 press fitted onto a pair of spaced-apart bearings 316 and 318 to define an annular channel section 320, as best seen in FIG. 12. The channel section 310 extends into the outer ring 312 and is fluidly connected to the channel section 320.

The inner ring 314 includes a channel section 321 that is in fluid communication with the channel section 320. The implement member 284 is fixedly attached by a clevis portion 322 to the inner ring 314. The clevis portion includes a channel section 324 fluidly connected to the channel section 321 and extending through the implement member 284 for fluid communication with a tool such as an air powered screw driver or paint sprayer.

The embodiment in FIGS. 11 and 12 also includes a universal joint 330 manufactured by Alfred Hayd Company of West Germany. The universal joint 330 is a precision movement-type universal joint.

An important feature of the apparatus of the present invention is that the apparatus is back-drivable. Since robot wrists are generally controlled by microprocesses, the ability to program on-line a sequence of moves has considerable advantages in time savings and flexibility of the apparatus of the present invention.

Although the present invention has been described with reference to preferred embodiments, workers skilled in the art will recognize that changes may be made in form and detail without departing from the spirit and scope of the invention.

What is claimed is:

1. A mechanical joint comprising:
    a support structure with a primary axis;
    a forward and a rearward bearing assembly spaced from each other, each assembly having an inner and outer bearing means, each bearing means having an outer race member, an inner race member, and a bearing section disposed therebetween, and each bearing assembly being positioned about a centerpoint disposed on the primary axis, the outer race of the outer bearing means being pivotally attached to the housing, the inner race member of the outer bearing means being pivotally attached to the outer race member of the inner bearing means, and the inner race member of the inner bearing means being pivotally secured to the housing;
    first linkage means for transmitting pivotal movement from the rearward outer bearing means to the forward outer bearing means and second linkage means for transmitting pivotal movement from the rearward inner bearing means to the forward inner bearing menas, each linkage means secured to the support structure and rigidly attached to the respective bearing means so that pivotal movement is transmitted by the linkage means;

drive means for effecting selective movement of the rearward inner and outer bearing means such that the movement is transmitted by the first and second linkage means to the forward inner and outer bearing means; and an implement member adapted for securing an implement thereto, said implement member being attached to the forward bearing assembly so that movement of the implement member is effected in a generally hemispherical operating range.

2. The joint of claim 1 wherein the driving means includes first and second spaced-apart push/pull rods, each push/pull rod independently acting on the support structure and having at least one universal joint, and a drive shaft disposed along the primary axis and attached to the inner ring of the rearward outer bearing such that pivotal movement is imparted to the inner and outer bearing means of the rearward bearing assembly.

3. The joint of claim 2 wherein the push/pull rods are spaced from each other approximately 90°.

4. The joint of claim 2 wherein each push/pull rod is independently actuated by a hydraulic cylinder.

5. The joint of claim 1 and further including a collar rotatably attached to the support structure and wherein the drive means includes means for holding the collar in a stationary angular position fixedly attached to the collar and a drive shaft secured to the rearward bearing assembly for rotating the support structure within the collar.

6. The joint of claim 5 wherein the means for holding the collar include first and second spaced-apart push/pull rods.

7. The joint of claim 5 wherein the drive shaft is disposed along the primary axis.

8. The joint of claim 1 wherein the drive means includes:

a triordinate drive shaft assembly having a first inner drive shaft member rotatable about the primary axis cooperating with the rearward bearing assembly so that pivotal movement is imparted to the inner bearing assembly, a second drive shaft member attached to the rearward bearing assembly for holding the support structure in a fixed angular position, and a third drive shaft member rotatable about the primary axis; and a pivot arm having first and second ends with the first end pivotally attached to the third drive shaft member and the second end pivotally secured to the support structure such that when the third drive shaft member is rotated, pivotal movement is imparted to the outer bearing means of the rearward bearing assembly.

9. The joint of claim 8 wherein the first and second ends of the pivot arm are disposed approximately 90° apart with respect to the primary axis.

10. The joint of claim 1 wherein the first and second linkage means are each non-parallel equal crank linkage assemblies.

11. The joint of claim 10 wherein the first linkage assembly includes a forward pivot pin in rotatable cooperation with the support structure and being fixedly attached at one end to the first linkage assembly and fixedly attached at another end to the outer race member of the forward outer bearing means and including a rearward pivot pin in rotatable cooperation with the support structure and being fixedly attached at a first end to the linkage assembly and fixedly attached at a second end to the outer race member of the rearward outer bearing means.

12. The joint of claim 10 wherein the second linkage assembly includes a forward pivot pin in rotatable cooperation with the support structure and being fixedly attached at one end to the second linkage assembly and fixedly attached at another end to the inner race member of the forward inner bearing means and including a rearward pivot pin in rotatable cooperation with the support structure and being fixedly attached at one end to the second linkage assembly and fixedly attached at another end to the inner race member of the rearward inner bearing means.

13. The joint of claim 1 wherein the first and second linkage means each include a forward spur gear and a rearward spur gear in cooperation with each other, each spur gear fixedly attached to a pivot pin that is in rotatable cooperation with the support structure and is fixedly attached at another end to the respective bearing means for transmitting pivotal movement from the respective bearing means of rearward bearing assembly to the respective bearing means of the forward bearing assembly.

14. The joint of claim 1 and further including a fluid passage comprising a first fluid passage section through the drive shaft, a second fluid passage section disposed within the inner race member of the rearward outer bearing means, a third fluid passage section disposed within the bearing section and the inner and outer race members of the outer bearing means, a fourth fluid passage section disposed within the outer race member, a rearward rotary union assembly rotatably attaching the rearward outer bearing means to the support structure and having a fifth fluid passage section, a sixth fluid passage section located within the support structure, a forward rotary union assembly having a seventh fluid passage section and rotatably attaching the forward outer bearing means to the support structure, an eighth fluid passage section disposed within the outer race member of the forward outer bearing means, a ninth fluid passage section disposed within the bearing section and the inner and outer race members of the forward outer bearing means, a tenth fluid passage section disposed within the inner race member of the forward outer bearing means and an eleventh fluid passage section disposed within the implement member, all of the fluid passage sections in fluid communication to form the fluid passage.

15. A bearing assembly for use in a mechanical joint having means for delivering motive force to a tool member, the assembly comprising:

first and second means for transmitting motive force;

an inner and an outer bearing means disposed about a common rotational centerpoint that each bearing means is rotatable about, each bearing means having an outer race member, an inner race member and a bearing section disposed therebetween, the assembly being disposed in a support structure with the inner race member of the outer bearing means being pivotally attached to the outer race member of the inner bearing means, and the inner race member of the inner bearing means and the outer race member of the outer bearing means each being pivotally attached to the support structure; and wherein the first and second means for transmitting motive force are operatively attached to the inner bearing means and the outer bearing means, respectively, in pivotal relationship with the support structure such that motive force is transmitted through the bearing assembly to the means for delivering motive force to a tool member.

16. The assembly of claim 15 wherein the outer and inner bearing means pivot about first and second pivot axes defined by first and second sets of pivot pins, respectively, said pivot axes disposed substantially perpendicularly to each other.

17. The assembly of claim 16 wherein the first set of pivot pins is rotatably secured to the support structure and fixedly attached to the outer race member of the outer bearing means.

18. The assembly of claim 16 wherein the second set of pivot pins is rotatably secured to the support structure and fixedly attached to the inner race member of the inner bearing means.

19. A wrist construction comprising:
a support structure;
means for delivering motive force to a tool member;
a first assembly having a first member and a second member and the first member pivotally attached to the support structure and the first and second members being retained about a first centerpoint during movement of the first and second members and the first and second members being movable about the first centerpoint;
a second assembly having a third member and a fourth member and the third member being pivotally attached to the support structure and the third and fourth member being retained about a centerpoint during movement of the third and fourth members and the third and fourth members being movable about the second centerpoint;
first linkage means for transmitting pivotal movement from the first member to the third member and second linkage means for transmitting pivotal movement from the second member to the fourth member with the first and second linkage means being attached to the first and second members and third and fourth members, respectively, such that the respective linkage means transmits movement between the respective members; and
wherein the first and second center points are disposed along a common axis and wherein the means for delivering motive force to a tool member is operatively connected to the first assembly such that movement is transmitted from the second to the first assembly and to the means for delivering motive force.

* * * * *